P. BOUËRY.
PROTECTIVE DEVICE FOR WATER CHANNELS.
APPLICATION FILED NOV. 22, 1915.
1,230,457.
Patented June 19, 1917.
2 SHEETS—SHEET 1.
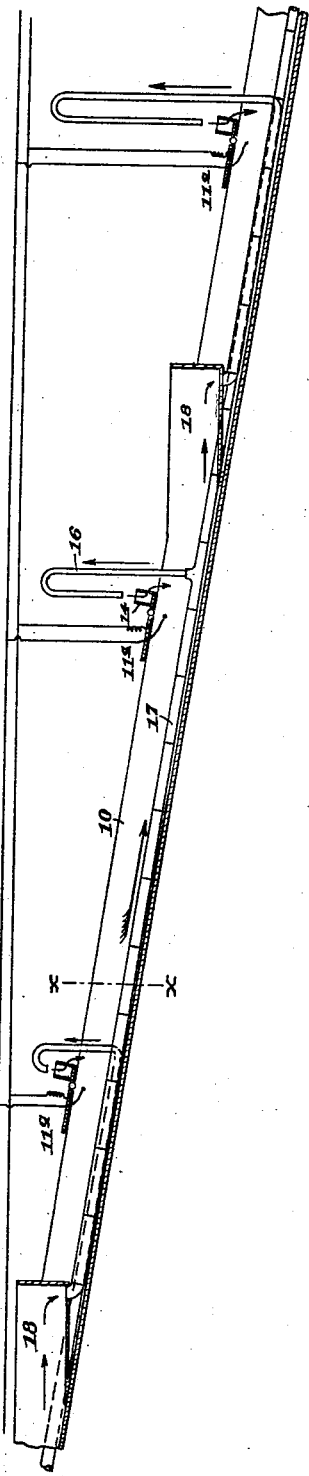
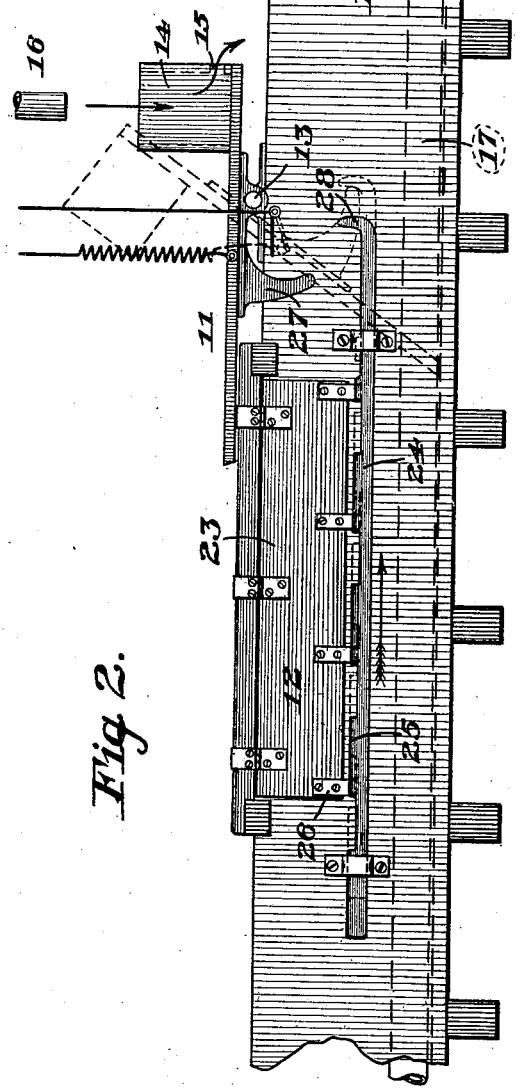
INVENTOR
Pierre Bouëry.

P. BOUËRY.
PROTECTIVE DEVICE FOR WATER CHANNELS.
APPLICATION FILED NOV. 22, 1915.
1,230,457.
Patented June 19, 1917.
2 SHEETS—SHEET 2.
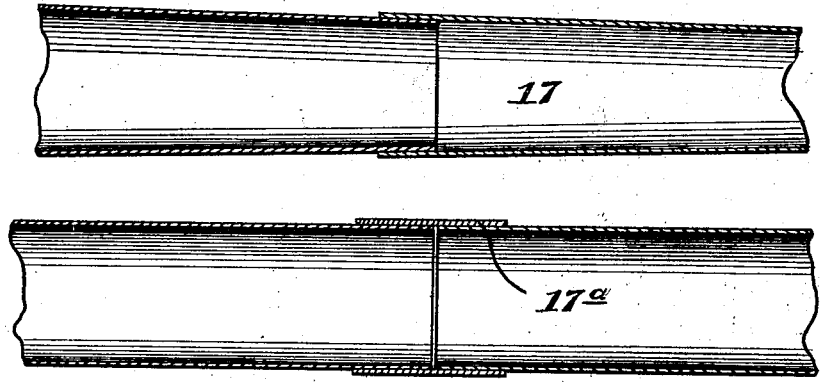
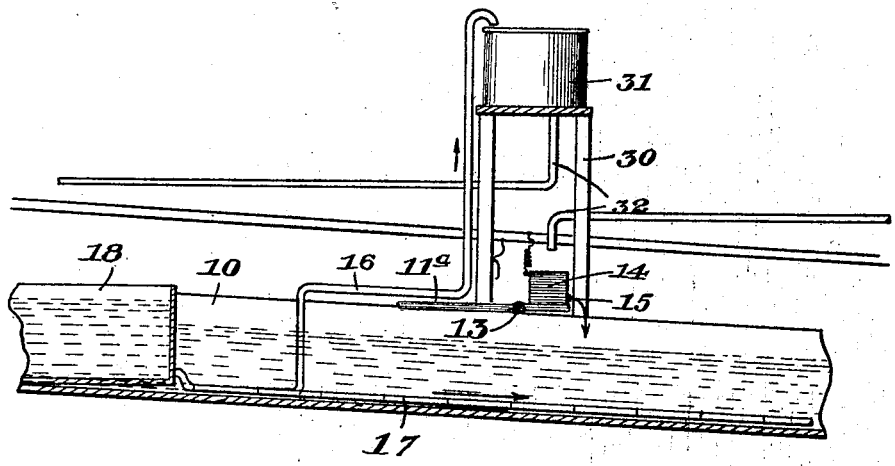
WITNESSES:
INVENTOR
Pierre Bouëry.
ATTORNEYS

UNITED STATES PATENT OFFICE.

PIERRE BOUËRY, OF WEAVERVILLE, CALIFORNIA.

PROTECTIVE DEVICE FOR WATER-CHANNELS.

1,230,457. Specification of Letters Patent. Patented June 19, 1917.

Application filed November 22, 1915. Serial No. 62,909.

*To all whom it may concern:*

Be it known that I, PIERRE BOUËRY, a citizen of the United States, residing at Weaverville, in the county of Trinity and State of California, have invented new and useful Improvements in Protective Devices for Water-Channels, of which the following is a specification.

This invention relates to protective devices for water channels; and has for its object to reduce to a minimum the damaging effects of a break in a channel, such as a flume or ditch, by the provision of means acting automatically to cut off the flow of water above the break immediately upon the occurrence of the rupture.

The principle of operation involved is based upon a continuous flow of water downwardly in the channel, which, by the provision of a special arrangement, permits a small part of the water to be returned for controlling the operation of the head-gate. The mechanism employed contemplates the provision of a flume or ditch with head-gates normally held open by a counterbalance consisting of a constant discharge water box and frangible feed pipes in the ditch or flume arranged to supply water to the water boxes by means of a back-pressure to maintain them normally at such levels as to counterbalance the gates and hold the latter open. When a break occurs in any section of the channel, the feed pipes, owing to their light construction, will also be broken at this point, and the back pressure is destroyed, resulting in the failure of the supply of water to the discharge box on the head-gate immediately in front thereof, so that the level of the water in the box falls, allowing the gate to close by gravity, thus cutting out the damaged section of the channel. The spillway, which is arranged adjacent to each gate, will carry off the water in safety and prevent the damage which would occur if the discharge took place elsewhere. Also, coincident with the closing of the gate, an electric contact is made which sounds an alarm in the watchman's cabin.

Several forms which my invention may assume are exemplified in the following description and illustrated in the accompanying drawings, in which—

Figure 1 shows a vertical, central, sectional view of a water flume or sluice provided with my protective device.

Fig. 2 shows an enlarged, vertical, central, sectional view of one of the gates and adjacent spillway.

Fig. 3 shows a vertical, central, sectional view of a modified form of the pressure supply and feed pipes employed.

Fig. 4 shows a vertical, central, sectional view of a modified arrangement of the counterbalancing boxes for the head-gates.

Referring in detail to the showing made in Fig. 1, of the drawings, the flume or sluice 10 is divided into longitudinal sections A—B—C, etc., of any desired number, each section including a head-gate 11, adjacent to which is a spillway 12, and, where desirable, one or more intermediate gates 11$^a$, said gates being preferably located several miles apart.

Each gate is carried on pintles 13 extending transversely on top of the flume and provided, at its upper end, with a counterbalance 14 consisting of a water box having a constant discharge outlet 15 near its bottom. For supplying water to the box 14, to maintain it substantially filled for the purpose of counterbalancing the gate, I provide a stand-pipe or feeder 16 in connection with a pressure supply pipe 17; the latter running along the bottom of the flume either within or at one side of the same and receiving its supply either from a distributing box 18, of the usual form, arranged in the main ditch, or from an independent source having a level above the box 14 to be filled. The supply pipe 17 is made of light sheet tin in telescoping sections, or in abutting sections joined together by small lengths of rubber hose 17$^a$.

A break in the channel will, necessarily, result in the flow of the water to one side, thus carrying the light sections of the supply pipe with the stream and pulling them apart or otherwise twisting and breaking them. Therefore, for all practical purposes, injury to the ditch or flume will be attended by a break in the frail supply pipe extending therethrough.

The upper ends of all feeder pipes connected to a single section of supply pipe are approximately on a level with the source of supply, and discharge at a uniform rate, each into its own water box, which box should be such, with relation to its outlet pipe 15, as to maintain a fixed quantity of water therein sufficient to overbalance the gate and retain it in open position.

Injury to the ditch or the flume of a nature to cause a break in the supply pipe will operate as follows:

Assuming that the pipe 17 is broken at the line x—x, this will have the effect of instantly cutting off the supply of water to the feeder pipes below that point, and inasmuch as the supply pipe at the broken point is discharging into the atmosphere, there will occur a gradual failure of the back pressure which normally causes water to rise in the feeder pipes immediately in front of the break. The water boxes on the gates will thus empty themselves through their discharge pipes 15 and allow the gates to drop successively, closing the channel. The water as it accumulates in the ditch will overflow through the spillway 12 adjacent to the first closed or head-gate, passing therefrom into a lateral or distributary communicating therewith. By the provision of the intermediate gates 11ª, all water between the head-gate and point of breakage is trapped. Such an arrangement of intermediate gates is desirable where the head-gates are located an unusually long distance apart; it being understood that the position of the head-gates is determined by the location of the laterals.

The pressure supply pipe 17 could, obviously, terminate either in a closed end or a feeder and could be made either of uniform or varying diameter throughout. The multiplicity of gates having feeder pipes communicating with each section thereof could be dispensed with in favor of a single gate near the front end of the supply pipe, where the laterals or spillways are in closer proximity.

It will be understood that an important requirement in this construction is that the supply pipe extend below the gates which it controls, so that at least one gate in front thereof will be closed to insure that the damaged section of the channel or pipe will always be cut out when a break occurs. Of course, the intake end of the supply pipe 17 will, where the channel water is utilized therein, have to be extended in front of the first or head-gate in order to be fed with water at a higher level than said gate. By overlapping the rear end of one supply pipe with the forward end of the supply pipe in the succeeding section, the water channel may be protected throughout its entire length.

Each gate carries a contact 19 connected to one terminal of an electric circuit 20, included in which is an alarm 21, and the other terminal of said circuit is provided with a stationary contact 22 in position to be engaged by the contact 19 and closed when the gate is dropped. The alarm 21 may be arranged in a watchman's cabin for the purpose of giving warning of the break in the pipes or ditch.

In many cases the normal level of the water is close to the top of the ditch or flume, and, consequently, the excess water caused when a gate is closed will not all be taken care of by an ordinary spillway, with the result that the water will overflow the ditch or flume at undesirable points. Hence, I provide a special form of spill-way allowing an increased discharge area and provide the same with a hinged gate 23 normally held closed by means of a slidable latch bar 24, having lugs 25 thereon to coöperate with clips 26 carried on the gate. A striker 27 is fixed upon the adjacent head-gate 11 in position to engage with a lug 28 on the end of the bar 24 when the head-gate is lowered, thus carrying the bar to position where the clips 26 will be released, whereupon the gate covering the spill-way will swing outwardly under the pressure of water and allow the same to discharge into the desired channel.

In the form of my device shown in Fig. 4 I employ a tower 30 at the lower end of each longitudinal section of the ditch to supply pressure for raising the water in the feeder pipes 16. The supply pipe 17 in this instance is arranged to conduct water to a tank 31 on the tower from a source of supply a considerable distance ahead of the said tower; the tank being on a level with or lower than said source. A return pipe 32 conveys water from the tank to the feeder pipes, which latter operate as before to maintain a constant supply of water in the counter-balancing boxes on the gates. A break or rupture in the pipes 17 or 32 will result in cutting off the supply of water to the counter-balancing boxes and consequently the closing of the head-gates to divert the water from the damaged sections of the ditch.

Where a slight grade is present in the water channel the counter-balancing boxes may be carried beneath the gates as shown in Fig. 4; and the sections may thus be made of shorter lengths on account of the decreased height to which the feeder pipes will be raised.

It will be understood that other changes in construction and arrangement of the several parts of my device may be employed without departing from the spirit of my invention as disclosed in the appended claims.

Having thus described my invention what I claim and desire to secure by Letters Patent is—

1. A protective device for water channels comprising in combination a head-gate in the channel, counter-balancing means operated by a constant flow of water to maintain the gate open, and means arranged along said channel for supplying the flow of water to the counter-balancing means, said supply means being arranged below the head-gate and operating to discontinue the supply of water thereto when a break occurs therein, whereby to permit the gate to close above the break.

2. A protective device for water channels, comprising in combination a series of gates arranged at intervals along the channel to close the same, and controlling means for each gate arranged along the channel and operable to maintain the gate ahead normally open, said controlling means being overlapped, whereby, when a break occurs in any part of the channel, the adjacent controlling means fails, whereupon the particular gate controlled thereby closes.

3. A protective device for water channels comprising in combination a head-gate in the channel, counterbalancing means operated by a constant flow of water to maintain the gate open, means arranged along said channel for supplying the flow of water to the counter-balancing means, said supply means being arranged below the head-gate and operating to discontinue its flow when a break occurs therein, a spill-way arranged adjacent said gate and normally closed, and means operated by the closing of said gate for opening the spill-way.

4. A protective device for water channels comprising in combination a head-gate, a constant discharge water box for counterbalancing said gate to normally maintain the same open, and a pressure supply pipe running along said channel below the gate for supplying water to said box whereby when a break occurs in the pipe the supply of water to the box is cut off to allow the gate to close.

5. A protective device for water channels, comprising in combination a head-gate for controlling a section of said channel, a constant discharge water box carried on said gate to counterbalance the same, a pressure supply pipe extending along said channel below the gate for supplying water to said box, a source of supply for said pipe having its level above said gate whereby when a breaking occurs in the supply pipe below the gate the supply of water to the box will be cut off to allow the gate to close, and a spillway located adjacent to said gate in front thereof to carry off the excess water when the gate is closed.

6. A protective device for water channels comprising in combination a plurality of gates for controlling a section of said channel, a constant discharge water box on each of said gates for maintaining the same normally open, a pressure supply pipe extending from a source located adjacent to the front gate and having a level above the box thereon, a feed pipe in communication with said supply pipe for furnishing water to each of said boxes, whereby, when a break occurs in said pipe, the supply of water to the boxes will fail, allowing all of the gates to close, and a spillway arranged adjacent to the first or head-gate to carry away the excess water.

7. A protective device for water channels comprising in combination a head-gate for controlling the channel, and a pressure supply pipe in said channel extending below the gate for furnishing water to counterbalance the gate, said pipe being constructed of fragile material to permit breaking of the same when the channel is cut away.

8. A protective device for water channels comprising in combination a head-gate for controlling a section of said channel, a supply pipe for said head-gate extending along the channel below the gate and arranged to furnish water for counterbalancing said gate to maintain the same normally open, whereby, when a break occurs in said supply pipe, the gate will close, the front and rear ends of the supply pipes in adjacent sections of said channel being overlapped to provide a protection for the entire length of the channel.

9. A protective device for water channels comprising a head-gate for controlling a section of said channel, and means for maintaining said gate normally open, said means comprising a fragile conduit extending along said channel below the gate for returning a small portion of the water in said channel, and a counterbalancing box on said gate fed by the conduit.

In testimony whereof I have hereunto set my hand in the presence of two subscribing witnesses.

PIERRE BOUËRY.

Witnesses:
JOHN H. HERRING,
W. W. HEALEY.